May 11, 1965 J. G. HOLMSTROM 3,183,018
VEHICLE SPRING SUSPENSION EMPLOYING TORSION SPRING MECHANISM
Filed Oct. 23, 1962 7 Sheets-Sheet 1

INVENTOR.
JOHN G. HOLMSTROM
BY
ATTORNEYS

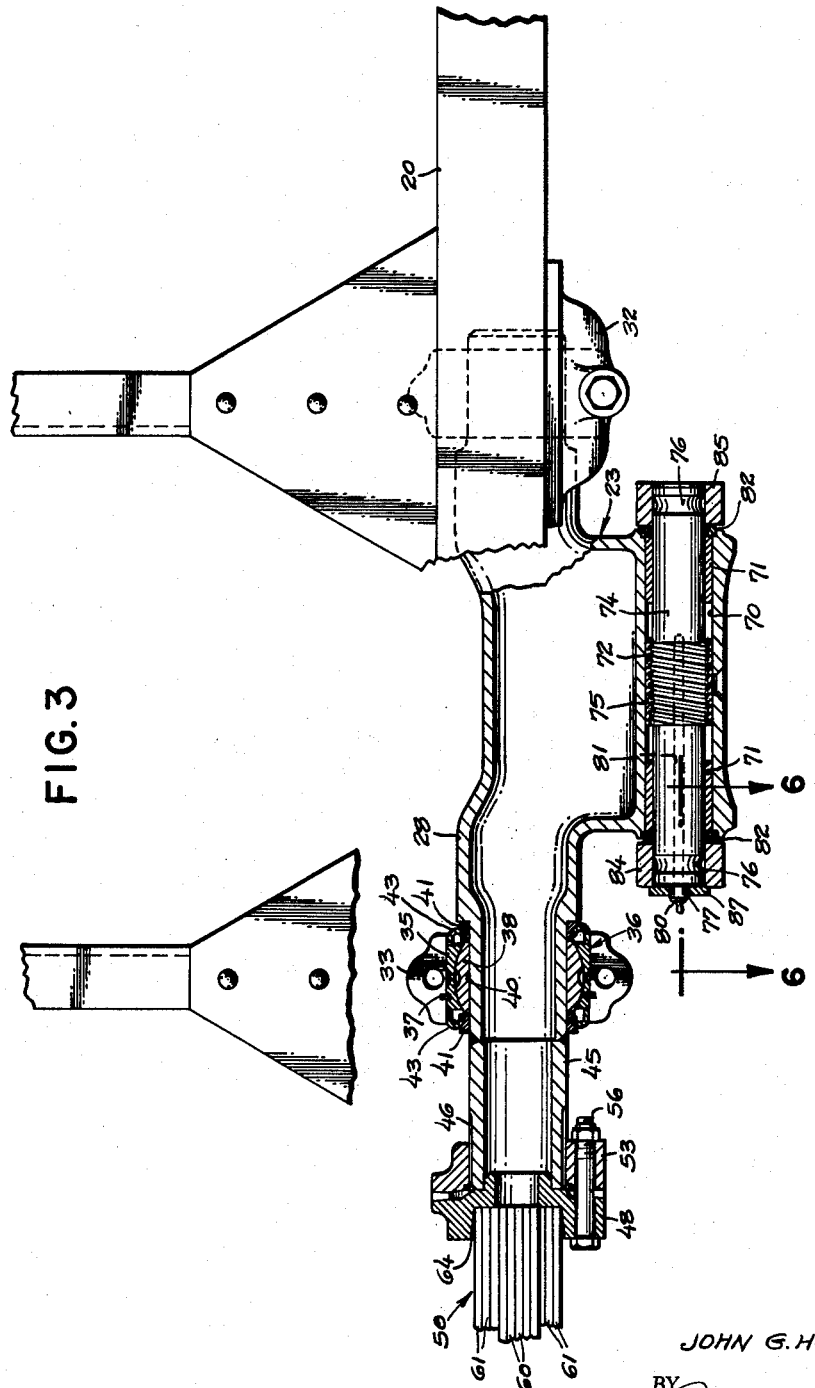

INVENTOR:
JOHN G. HOLMSTROM
BY
ATTORNEYS

May 11, 1965 J. G. HOLMSTROM 3,183,018
VEHICLE SPRING SUSPENSION EMPLOYING TORSION SPRING MECHANISM
Filed Oct. 23, 1962
7 Sheets-Sheet 4
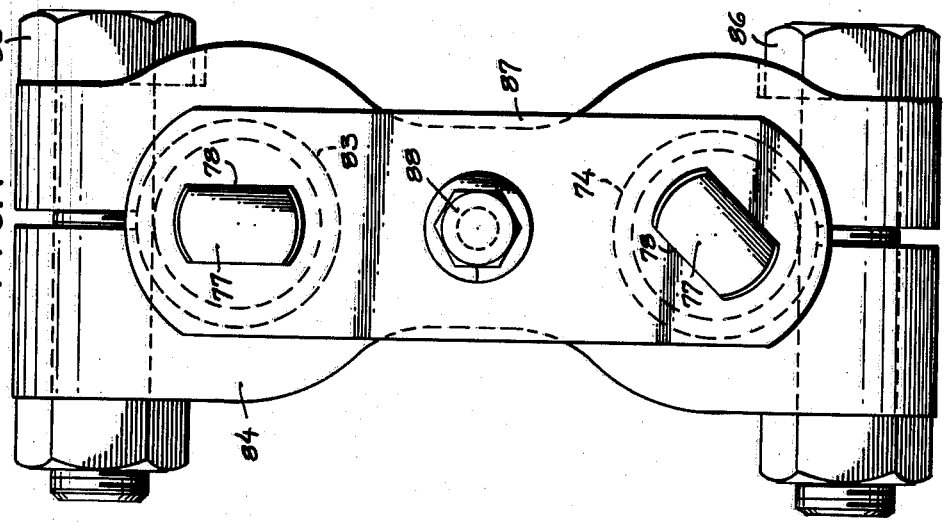
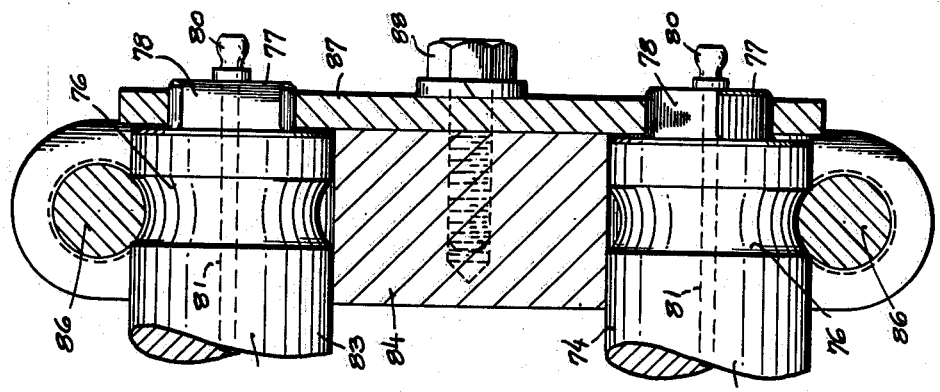
INVENTOR:
JOHN G. HOLMSTROM
BY
ATTORNEYS

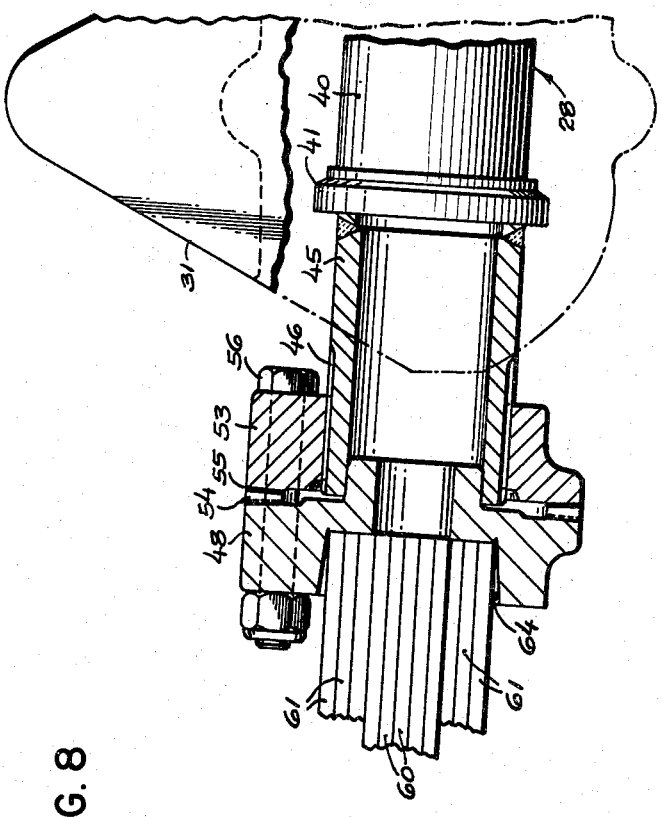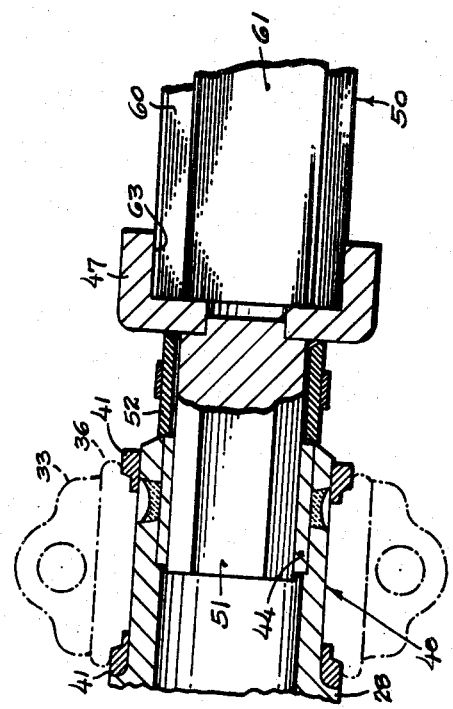
FIG. 8
INVENTOR.
JOHN G. HOLMSTROM
BY
ATTORNEYS

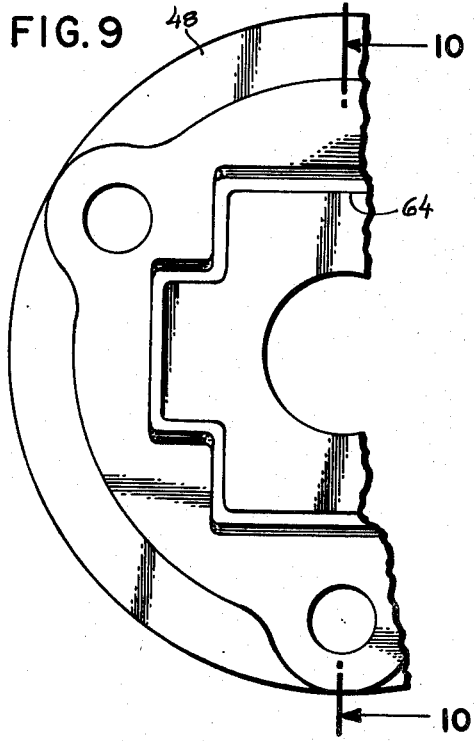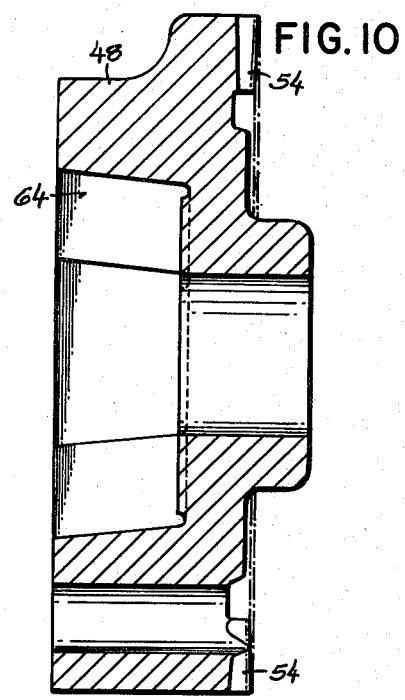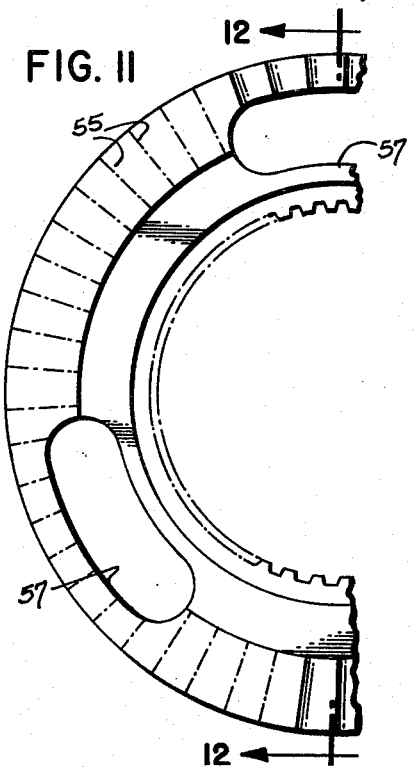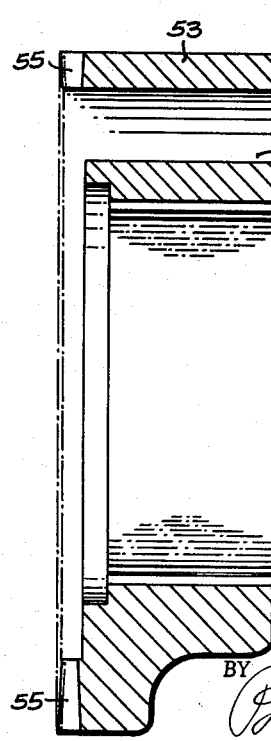

May 11, 1965  J. G. HOLMSTROM  3,183,018
VEHICLE SPRING SUSPENSION EMPLOYING TORSION SPRING MECHANISM
Filed Oct. 23, 1962  7 Sheets-Sheet 7

INVENTOR.
JOHN G. HOLMSTROM
BY
ATTORNEYS

United States Patent Office 3,183,018
Patented May 11, 1965

3,183,018
VEHICLE SPRING SUSPENSION EMPLOYING TORSION SPRING MECHANISM
John G. Holmstrom, Seattle, Wash., assignor to Pacific Car and Foundry Company, Seattle, Wash., a corporation of Washington
Filed Oct. 23, 1962, Ser. No. 232,421
14 Claims. (Cl. 280—104.5)

This invention relates to suspension mechanism for tandem-axle vehicles employing as the springing agent a torsion member which is subjected to torsional deflection due to load, and bodily rotation on its axis due to road irregularities or a combination of both. In the preferred embodiment this torsion member is desirably composed of a bundle of flat spring leaves but a torsion rod can also be employed, albeit with a sacrifice of some of the advantages which the spring bundle provides. The improvements of the present invention particularly lend themselves to the type of suspensions illustrated and described in U.S. Letters Patents 2,333,008, issued October 26, 1943, 2,428,160, issued Sept. 30, 1947, 2,395,183, issued February 19, 1946, and 2,413,212, issued December 24, 1946.

For simplicity in description the term "bar" will be hereinafter employed in generic reference to both of the referred-to types of torsion springs, namely a spring rod and a bundle of spring leaves. In the first three of the above-named patents the suspension is applied to a tandem axle vehicle, with each axle being shackled to a respective one of two crank arms journaled from the vehicle frame for wrist motion about a horizontal axis extending longitudinally of the vehicle. The torsion spring may be a single bar having one end anchored to the hub of one crank and the other end anchored to the hub of the other crank, in which event the two crank arms extend one inwardly and the other outwardly from the wrist axis so that movements of the two axles in a like direction twist the bar. In the embodiment of the second said patent, in which there is similarly employed, at least as the primary springing agent, a single torsion bar, the two crank arms point in the same direction, this being accomplished by anchoring one end of the bar to the hub of one crank and introducing a reversing mechanism between the other end of the torsion bar and the hub of the other crank arm. The third of the above-identified patents likewise uses a reversing mechanism and is distinguished from the structure of the second patent by having the reversing mechanism applied as a connecting couple between the inner ends of two torsion bars, one of which has its outer end anchored to the hub of one crank and the other of which has its outer end anchored to the hub of the other crank. Each of these three types of suspensions may be said to be free-floating in the sense that the torsion bar (or bars) is entirely free of a torsion-resisting frame anchor and thus passes into the frame only a perpendicular mean of the resisting forces built up within the bar by the axle-influenced torsional twist. The last-named of the above-mentioned patents discloses a suspension applied to only a single axle, tying this axle to one end of a single torsion bar by means of a frame-carried crank, and anchoring the other end to the vehicle frame.

As one of its principal objects the present invention purposes to apply the spring suspension in a manner which permits finer adjustments than has heretofore been possible and in which these adjustments can be performed with unusual ease and expedition.

One of the adjustments for which provision is made is that of the restraint spring load imposed by the torsion bar, and a further and important object is to engineer into the suspension an accommodation therefor which permits an unusually low frame.

An important additional object is to provide a torsion spring suspension which, by employing flat leaves, obviates need of tubular extensions and thus permits achievement of the necessary degrees of wind-up at reasonable miximum stress in a much shorter over-all length than has heretofore been possible, also giving considerable saving in weight and cost by comparison with rod-type torsion springs.

A yet further important object is to provide a torsion bar suspension having journal mountings which are improved from the standpoint of providing an assembly which can be more easily serviced and which will assure a longer and more trouble-free life.

These and still additional objects and advantages in view will appear and be understood in the course of the following description and claims, the invention consisting in the novel construction and in the adaptation and combination of parts hereinafter described and claimed.

In the accompanying drawings:

FIG. 3 is a fragmentary sectional view drawn to an enlarged scale on the horizontal plane occupied by the torsion spring. The axle and the perch which surmounts same is deleted from the view.

Figure 1:
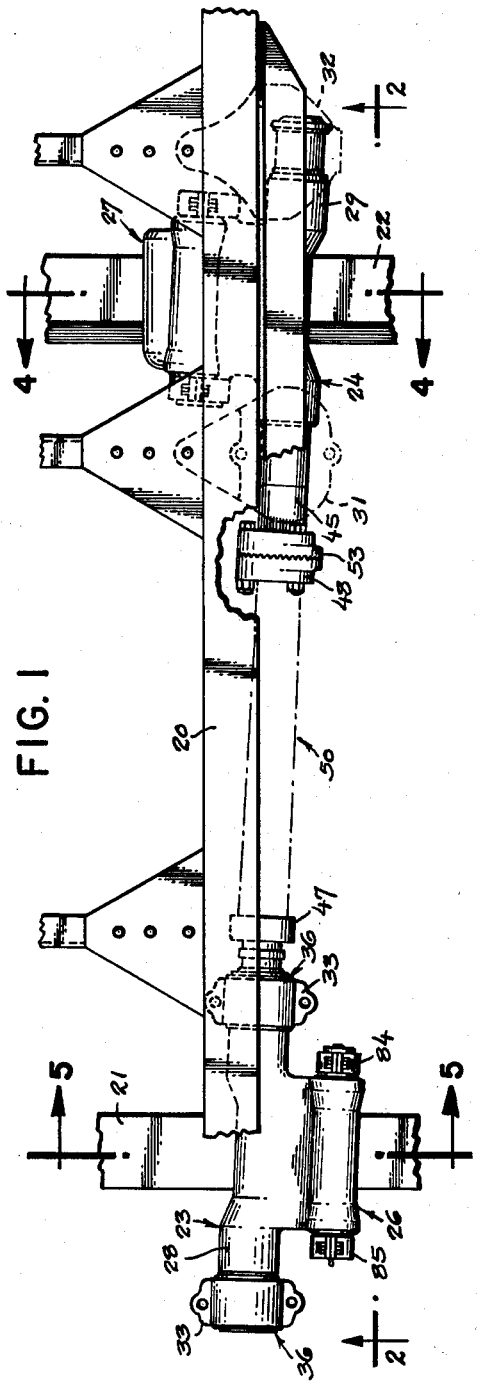
FIGURE 1 is a fragmentary top plan view illustrating one side of a tandem-axle truck having a torsion-bar suspension constructed and arranged in accordance with the preferred embodiment of the present invention, namely a suspension employing a bundle of spring leaves as the torsion bar, and with the ground wheels deleted.
Figure 2:
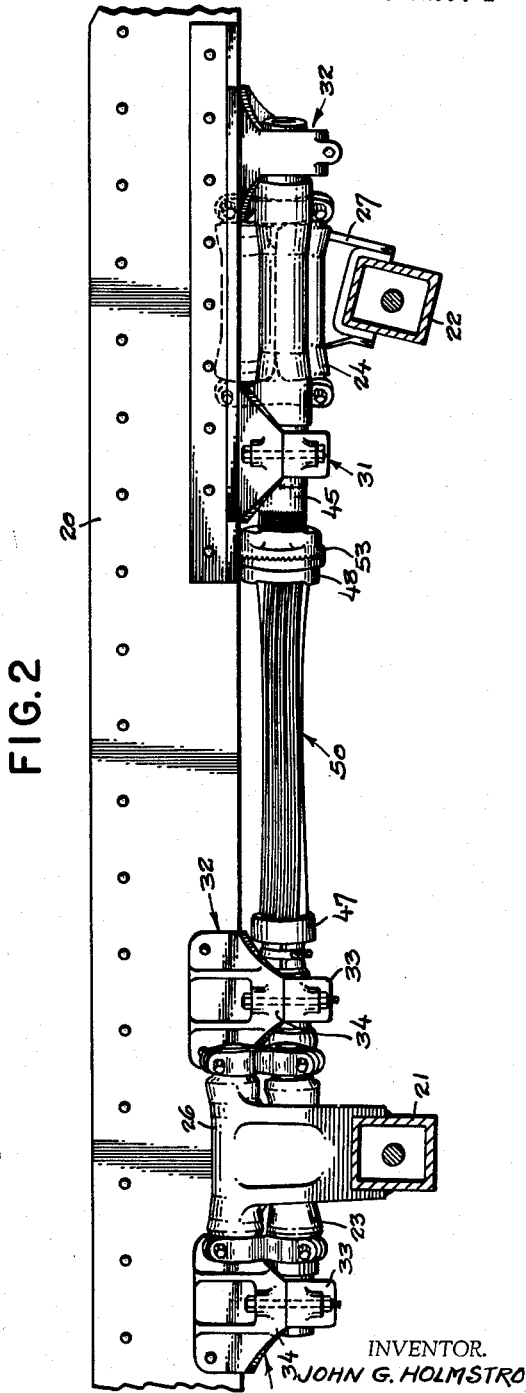
FIG. 2 is a longitudinal vertical sectional view thereof on line 2—2 of FIG. 1.
Figure 5:
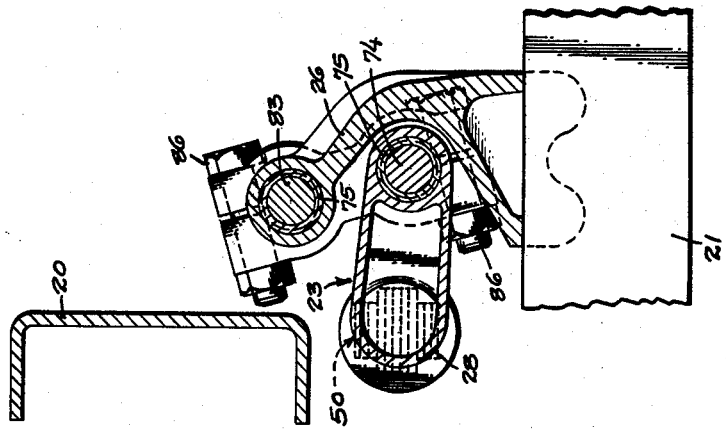
Figure 4:
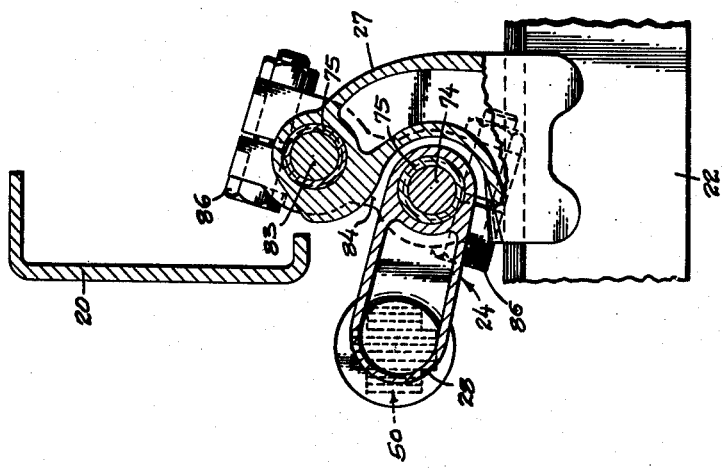

FIGS. 4 and 5 are fragmentary transverse vertical sectional views drawn to an enlarged scale on lines 4—4 and 5—5, respectively, of FIG. 1.

FIG. 6 is a fragmentary longitudinal vertical sectional view drawn to a yet larger scale on line 6—6 of FIG. 3.

FIG. 7 is an end elevational view of the structure shown in FIG. 6.

FIG. 8 is a fragmentary enlarged-scale horizontal sectional view detailing structure by means of which the bundle of spring leaves, placed to occupy an intervening position between co-axial hubs of two longitudinally spaced frame-carried cranks, is connected one end to one and the other end to the other of the two facing ends of said crank hubs.

FIGS. 9 and 11 are fragmentary enlarged-scale elevational views of the two components which compose the adjustable coupling which is provided for one end of the spring bundle.

FIGS. 10 and 12 are longitudinal vertical sectional views on lines 10—10 of FIG. 9 and 12—12 of FIG. 11, respectively.

Figure 13:
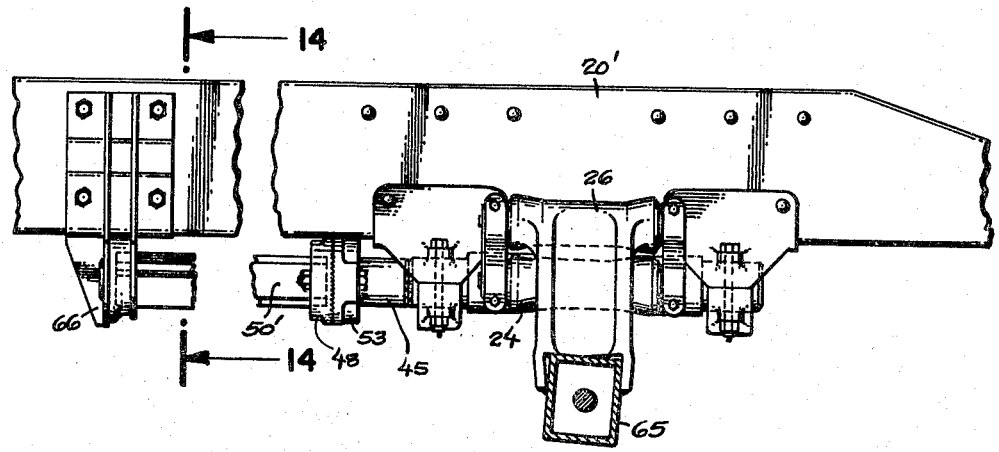
Figure 14:
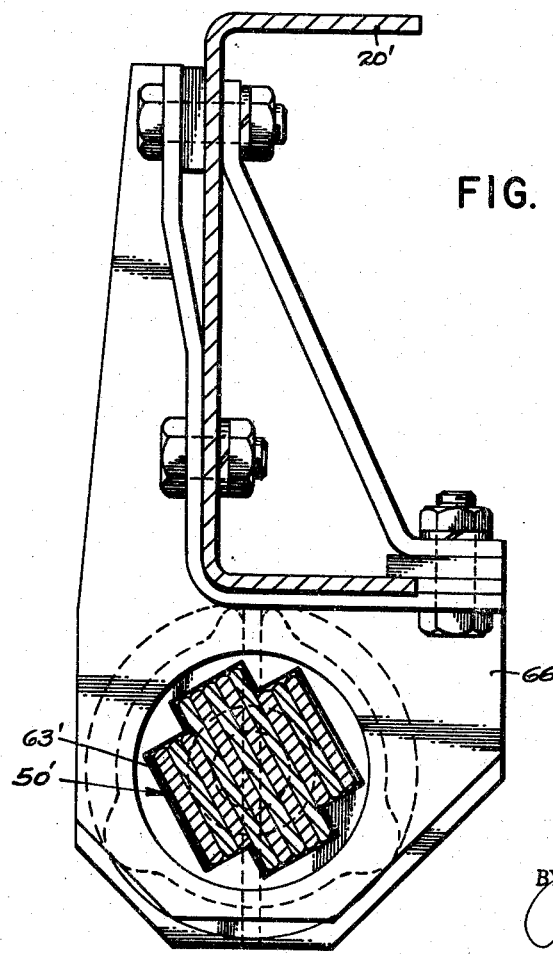

FIG. 13 is a fragmentary longitudinal vertical sectional view showing the spring bundle applied to a single axle suspension; and FIG. 14 is an enlarged-scale transverse vertical sectional view on line 14—14 of FIG. 13.

Referring to said drawings, the numeral 20 designates one of the two longitudinal principals of the vehicle's main frame, and 21 and 22 respectively indicate the longitudinally spaced housings for the front and rear axles for the vehicle's tandem rear wheels. It will be understood that the illustrated suspension is provided for each of the two sides of the vehicle. Each of the parts hereinafter described finds its counterpart at the opposite side of the frame but excepting as oscillation of one end of an axle transmits a modified motion to the other end of the axle the two suspensions, one upon one side and the other upon the other side of the vehicle, are independent of one another.

As with the suspension of the first above-identified patent, the present suspension, in its preferred embodiment, has a pair of levers 23 and 24, or cranks as they will be hereinafter termed, supported by frame-carried brackets for rocker movements about axes extending longitudinally of the frame. These rocker axes coincide and desirably lie in such angularity to the longitudinal median line of the vehicle that the trailing wheel of the tandem axle assembly is closer to such rocker axis than is the leading wheel. The arms of the two cranks lie more or less in the transverse vertical plane of the related axle housing 21 or 22, as the case may be, and extend horizontally outwardly in the instance of the front arm and horizontally inwardly in the instance of the rear arm. A perch, as 26 and 27, welded or otherwise fixed one to the front and the other to the rear axle housing of the tandem assembly overhangs the free end of the related crank arm and is attached thereto by shackle links. The torsion spring 50 of the assembly extends between and is attached by its ends to the hubs of the cranks, and performs its spring function by imposing upon the two hubs torsional influences which yieldingly counter one another.

At each of two axially spaced points each crank arm has its hub portion 28 supported by a respective one of said frame-carried brackets, one bracket 31 lying to the front and the other bracket 32 lying to the rear of the transverse vertical plane of the concerned axle. Each bracket has a cap 33 boltably attached to a base 34, and with the latter produces a cylindrical bearing which carries the outer complement 35 of a self-aligning spherical journal 36. A split ring 37 retains said outer complement against endwise motion. The ends of each hub are necked down to form seats receiving a respective one of the inner complements of said self-aligning journals. Two sleeves 41 retain each of said inner complements. One such sleeve bears against a shoulder and the other sleeve is fixed by a weld. Grease seals 43 fit over the sleeves at each of the two ends of each journal.

At the inner ends of the hubs 28 of the two cranks, and namely the ends of said hubs which are in facing relation, one hub has an integral liner 44 formed internally with an hexagonal socket. The other hub is prolonged axially by welding an externally splined tube 45 thereto. A spring bundle 50 is adapted to occupy an intervening position between said hubs of the two cranks, and has its ends connected to the hubs by means of hub fittings. These hub fittings each carry an outwardly facing socket-piece, as 47 and 48, in which the concerned end of the spring bundle fits, the fit being such as to couple the socket-piece to the socketed end of the spring bundle so that the two turn in concert. The axis of the socket-pieces coincides with the rocker axis of the cranks. The socket-piece 47, for its attachment to the related hub, has a stud 51 welded or otherwise integrally secured thereto. The stud has a mating fit in the hexagonal socket of the liner 44. A spacer 52 surrounds the stud between the socket-piece and the hub. The other socket-piece 48, for its attachment to the other hub, is backed by a coupling ring 53 which has internal splines fitting the external splines of the tube 45. The socket-piece 48 presents a nose which has a piloting fit within the tube 45, and the connection between such socket-piece 48 and its backing ring 53 is one which permits the former to be rotatively adjusted relative to the latter. To accomplish this end the meeting faces of the pieces 48 and 53 are formed with mating radial teeth, as 54 and 55. Nutted bolts 56 are carried by the socket-piece 48 at circumferentially spaced intervals and each extends through an arcuate slot 57 formed in the backing ring 53.

The torsion spring 50 is composed of a bundle of flat spring leaves and, preferably, such bundle comprises a center section of comparatively wide leaves 60 flanked on each face by sections of narrower leaves 61. The bundle thus has the general shape of a Greek cross when viewed from the end. The plan configuration of the sockets 63 and 64 of the socket pieces 47 and 48 suggests a voided Greek cross of corresponding shape. In applying the spring bundle 50 the ends are lodged within the sockets while the bottom of the frame occupies a level elevated by blocks or jacks a predetermined distance above the top of the axle housing. Upon removal of the elevating blocks or jacks from under the frame, should it be found that the frame height is not correct such can be changed by again jacking up the frame and modifying the spring tension by rotatively adjusting the toothed socket-piece 48 in the necessary degree. This adjustment is accomplished by loosening the bolts 56, slipping the coupling ring 53 rearwardly a distance sufficient to separate the teeth 54 and 55, then forcefully turning the socket-piece 48 as desired, and finally again bringing the teeth 53 and 54 into mesh and tightening the bolts 56 to secure the parts. The twist given to the related end of the spring bundle by shifting the socket-piece by only a single tooth produces a substantial change in the spring tension. Slots 57 permit a shift comprehending the arcuate span of several teeth. It will be seen that the piloting fit of the socket-piece in the tube 45, and the guide action of the bolts 56 as they slide in the slots 57, maintains the socket-piece co-axial with the tube as an adjusting turn is being imposed upon the socket-piece.

In the vehicle illustrated in FIGS. 13 and 14 having only the single rear axle 65, one end of the spring bundle 50′ is anchored to the vehicle frame by lodging in a socket 63′ presented by a bracket 66 boltably secured to the related longitudinal principal 20′ of such frame.

Reverting to the arm portions of the cranks and their shackle attachment to the related perch, each of said arms is made rather long, considered in the direction of the rocker axis which the spherical journals provide, and a through-bore 70 is provided in the free end on an axis paralleling said rocker axis. At each of the two ends of the bore a smooth-faced bushing 71 is fitted in the bore. A third bushing 72, internally threaded, is fixed in place between these end bushings. The internal threads of such latter bushing are fine-pitched.

A wrist pin 74 is received in said through-bore 70 and central to its length presents an enlarged portion 75 externally threaded to form a mating counterpart of the internal threads of the bushing 72. The ends of the pin extend beyond the crank arm, are circumferentially grooved, as at 76, and at one end present a reduced concentrically placed head projection 77 presenting flats 78 at diametrically opposite sides. A grease fitting 80 at an end of the pin leads by a drilled passage 81 to the central threads. Bellows seals 82 surround the pin 74 at each end of the crank arm.

The previously mentioned overhanging ends of the perches 26 and 27 each present a through-bore identical with that of the crank arms, and a respective wrist pin 83 identical with the wrist pin 74 is received in each of these through-bores. Links 84 and 85 shackle the related pairs of pins 83-74, and these shackling links each present split ends which are clamped to the wrist pins by nutted bolts 86, the bolts lodging in the circumferential grooves 76 to lock the links against displacement in a direction endwise to teh pins.

A lock plate 87 overlies one of the shackle links and is formed much in the nature of a box wrench in that openings are provided in each of the two ends to fit the flat-sided heads 78 of the pins. The locking function performed by the lock plate is that of holding the wrist pins against turning motion relative to the shackle links. A bolt 88 threads into the related shackle link between the two ends for releasably holding the plate in its locking position.

It will be apparent that the front and the rear axles of the tandem assembly may be shifted either toward the front or toward the rear, relative to the frame, by releasing the shackle links from their clamping engagement with the wrist pins and imparting rotation to the wrist pin or pins so that the male threads of the pins work in the female threads of the respective bushings 72. The rotation given to the pins is one or more half-turns so as to bring the flat-sided heads into exact registration with the mating box openings of the lock plate. Following said adjustment the shackle links are clamped to the wrist pins and the lock plate secured by the bolt 88. Moderate clearance is provided to the inside of the shackle links in order to compensate the same to the endwise adjustment which the wrist pins provide.

A particular advantage of a torsion bar which is composed of a short bundle of spring leaves, as compared with a bar consisting of a rod having considerable length, should perhaps be here noted. This is the ability to put a major offset in the portion of the crank's hub which lies between the two frame journals. A rod precludes an offset of sufficient degree to project beyond the torsional axis in that the rod passes through the hollow center of the hub. With no rod to be concerned with, it becomes possible, in instances where it is desired to have the frame occupy a low level, to so form the hub 23 of the crank that the portion thereof which overlies the axle, namely the portion which lies between the two journalled ends 40, is offset upwardly from said ends. This offset can be quite substantial. Producing, as such an offset does, a space into which the axle can rise under a condition of "axle bump," the axle can then normally lie in closer proximity to the frame than would be the case if the hub's center portion were to lie in the same horizontal plane as its journalled ends.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims be given the broadest interpretation to which the employed language fairly admits.

What I claim is:

1. The structure applied to each side of a vehicle for springing the vehicle frame from an axle, employing as the springing agent a bundle of flat spring leaves characterized in that at least one end of the bundle is non-circular in cross-section, and comprising, in combination with the frame, the spring bundle, and the axle: a pair of longitudinally spaced axially aligned bearings fixed to the frame, a crank working in the space between said bearings and having its hub prolonged axially from both ends to extend into and receive a journal from the bearings, one of said axial prolongations having its outer end projecting beyond the end limit of the related bearing, a terminal fitting securely connected to the outer end of said projecting end and presenting an outwardly-opening socket in its exposed face formed as the mating complement of said non-circular end of said spring bundle and receiving said non-circular end therein, the spring bundle extending endwise to the journal axis of the crank outwardly from the terminal fitting, a connection from the axle to the arm of the crank acting to impart wrist motions to the crank in response to vertical motion of the axle, and locating means engaging the other end of the spring bundle acting (1) to position the bundle so that its longitudinal axis approximately coincides with the journal axis of the crank and (2) imposing restraint upon the engaged end so that the spring bundle partakes of a torsional wind-up as said socketed end is turned.

2. Structure according to claim 1 in which said bearings are spherical self-aligning bearings sealed against access of road grime.

3. Structure according to claim 1 in which said bearings are spherical self-aligning assemblies comprised of inner and outer complements with the outer complement rigidly clamped between the base and cap components of a split frame mounting.

4. Structure according to claim 1, said terminal fitting being a two-piece structure comprised of an inner piece splined to the projecting end of the crank hub and an outer piece carried for rotative adjustment by the inner piece, the socket in which said end of the spring bundle is received being formed in the outer piece.

5. Structure according to claim 1, said connection from the axle to the crank arm comprising: a perch fixed to the axle and extending upwardly therefrom into overhanging relation to the free end of the crank arm, respective pins journaled in the free end of the crank arm and said overhanging end of the perch for wrist motion about axes paralleling the journal axis of the crank and projecting by both ends laterally beyond said perch and crank arm, said pins being held against endwise displacement relative to the crank arm and the perch, and links rigidly clamped to said projecting ends of the pins to shackle the crank arm to the perch.

6. Structure as recited in claim 5 in which the two pins have a threaded engagement one with the crank arm and the other with the overhanging end of the perch whereby the act of turning the pins causes the same to be shifted in an endwise direction into positions axially adjusted with respect to the crank arm or the perch, as the case may be, and thus responsively shifting the axle forwardly or rearwardly with respect to the vehicle frame.

7. The structure applied to each side of a tandem-axle vehicle for springing the vehicle frame from the tandem axles, comprising, in combination with the frame and the axles: co-axial sets of paired bearings one set for each of the tandem axles having the two bearings of each set fixed to the frame in positions elevated with respect to the related axle and longitudinally spaced one to the front and the other to the rear of the transverse vertical plane occupied by the axle, a respective crank working in the space between each of said pairs of bearings and each having its hub prolonged axially from both ends to extend into and receive a journal from the bearings, a respective perch fixed to each axle and extending upwardly therefrom into overhanging relation to the arm of a related crank, links shackling said overhanging ends of the perches to the free ends of the related crank arms, and torsion spring mechanism comprised of a bundle of spring leaves extending between the two cranks and interconnected with the facing inner ends of the hub portions thereof, the hook-up from one to the other axle through the cranks and torsion spring mechanism being such as to impose a torsional wind-up upon the torsion spring mechanism responsive to like directive movements of the two axles.

8. The structure appiled to each side of a tandem-axle vehicle for springing the vehicle frame from the tandem axles, comprising, in combintion with the frame and the axles: a respective pair of longitudinally spaced axially aligned bearings fixed to the frame above each of said axles, said pairs being co-axially disposed and spaced apart, a respective crank working in the space between the two bearings of each of said pairs of bearings and each having its hub prolonged axially from both ends to extend into and receive a journal from the related bearings, the extreme inner ends of said hubs, namely the ends which are in facing relation an end of one hub toward an end of the other hub, being formed one internally with a non-circular exposed socket and the other externally with an exposed spline, two slip-fit coupling members one providing a stud receiving a mating fit in the non-circular socket and the other providing internal splines to fit said external splines, a torsion spring composed of a bundle of spring leaves occupying a position in the space between said journaled hubs with its torsional axis coinciding with the journal axis of the hubs, and socket-pieces carried by said coupling members providing sockets for the mating reception of the two ends of the torsion spring, one of said socket-pieces being integral with the related coupling, the other socket-piece being rotatively adjustable relative to the related coupling, the arm of one of said cranks being directed outwardly from the hub and the arm of the other crank being directed inwardly from the hub, and connections from the axles to the related crank arms acting by like directive movements of the axles to rock the cranks in different rotary directions so as to impart opposite rotational tendencies to the two ends of the torsion bar.

9. Structure according to claim 8 in which said bearings are spherical self-aligning assemblies comprised of inner and outer races with the outer race rigidly clamped between the base and cap components of a split frame mounting.

10. Structure according to claim 8 in which the rotatively adjustable socket-piece and the related coupling provide mating teeth on meeting faces thereof, the socket-piece having a pilot fit in the extreme inner end of the related hub, nutted bolts being provided for releasably fixing the socket-piece in rotatively adjusted positions.

11. Structure according to claim 8, the connection from each axle to the related crank arm comprising a respective pair of pins journaled one from the axle and the other from the crank arm for wrist motion about vertically spaced axes paralleling the journal axis of the related crank, each of said pins having both ends exposed beyond the journal, and links rigidly clamped to said exposed ends of the pins to shackle the crank arm to the perch, said wrist journals being comprised in part of internally threaded bushings fast to the axle or the crank arm, as the case may be, and receiving a correspondingly threaded stud portion of the concerned pin, means being provided to positively lock the two related pins of a pair against relative rotation.

12. The structure applied to each side of a vehicle for springing the vehicle frame from an axle, comprising, in combination with the frame, and the axle: a pair of longitudinally spaced axially aligned bearings fixed to the frame, a crank working in the space between said bearings and having its hub prolonged axially from both ends to extend into and receive a journal from the bearings, the arm of the crank overhanging the axle, a connection from the axle to said arm of the crank acting to impart wrist motions to the crank in response to vertical motion of the axle, a torsion spring anchored by one of its ends to the hub so as to turn therewith, and restraining means engaging the other end of the torsion spring causing the spring to partake of a torsional wind-up as said anchored end is turned, said connection from the axle to the crank arm comprising a perch fixed to the axle and extending upwardly into overhanging relation to the free end of the crank arm, respective pins journaled in the free end of the crank arm and said overhanging end of the perch for wrist motion about axes paralleling the journal axis of the crank and projecting by both ends laterally beyond said perch and crank arm, said wrist journals for the pins being comprised at least in part of internally threaded bushings fast to the perch or the crank arm, as the case may be, and receiving a correspondingly threaded stud portion of the concerned pin, links rigidly clamped to said projecting ends of the pins to shackle the crank arm to the perch, flats upon an exposed end portion of each pin for turning the pin to adjust the same in an endwise direction as the threads of the stud work in the threads of the bushing, and a removable plate common to the two pins having openings in which said flats of the exposed end portions fit for positively locking the two pins against relative rotation.

13. Structure as recited in claim 12, each of said pins having an exposed grease fitting on one end leading by a drilled passage to said threads of the journal, said frame-carried bearings and the pin journals being each sealed against access of road grime.

14. Structure applied to each side of a vehicle for springing the vehicle frame from a vehicle rear axle comprising, in combination with the frame and the axle: a crank overlying the axle and providing a hub journaled from the frame for rocker motion about an axis generally longitudinal to the frame, the free end of said crank extending laterally from the hub, a connection from the axle to said free end of the crank acting to impart wrist motions to the crank in response to vertical motion of the axle, a torsion spring comprised of a bundle of flat spring leaves positioned so that its torsional axis coincides with the rocker axis of the crank, means coupling one of the ends of said spring bundle to the hub of the crank so that the coupled spring end turns in concert therewith, restraining means, and means coupling the other end of the torsion spring to the restraining means causing the spring to partake of a torsional wind-up as the hub of the crank turns by said vertical motion of the axle, at least one of the coupling means comprising two boltably connected meeting members provided on their meeting faces with mating radial teeth extending about the circumference of a circle having the rocker axis of the hub as its center, the bolts which connect said members being carried by one such member and extending through arcuate slots provided by the other such member so as to permit rotative adjustment of the one relative to the other said member.

References Cited by the Examiner
UNITED STATES PATENTS

| | | | |
|---|---|---|---|
| 2,198,616 | 4/40 | Hickman | 280—124 X |
| 2,333,008 | 10/43 | Holmstrom | 280—124 X |
| 2,977,132 | 3/61 | Bainbridge | 280—124 |

FOREIGN PATENTS 623,868    1/36    Germany.

A. HARRY LEVY, *Primary Examiner.*